United States Patent
Khandelwal et al.

(10) Patent No.: US 8,850,399 B2
(45) Date of Patent: Sep. 30, 2014

(54) SOFTWARE DEVELOPMENT USING CODE RETRACTION AND BACKGROUND WARM UP

(75) Inventors: Nikhil Khandelwal, Kirkland, WA (US); Iouri B. Simernitski, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 241 days.

(21) Appl. No.: 12/945,913

(22) Filed: Nov. 15, 2010

(65) Prior Publication Data

US 2012/0124557 A1  May 17, 2012

(51) Int. Cl.
G06F 9/44 (2006.01)
G06F 11/36 (2006.01)

(52) U.S. Cl.
CPC .......... *G06F 11/3664* (2013.01); *G06F 11/362* (2013.01)
USPC .......................................... 717/125; 717/127

(58) Field of Classification Search
CPC ............................. H04L 67/10; H04L 69/329
USPC .................... 714/31; 717/129, 162, 124–125, 717/130–131; 709/223; 705/1; 715/771
See application file for complete search history.

(56) References Cited

U.S. PATENT DOCUMENTS

| | | | | |
|---|---|---|---|---|
| 5,675,803 A * | 10/1997 | Preisler et al. | ................ | 717/131 |
| 6,011,920 A * | 1/2000 | Edwards et al. | ............... | 717/130 |
| 6,115,550 A * | 9/2000 | Hunter et al. | ................. | 717/162 |
| 6,158,045 A * | 12/2000 | You | ............................... | 717/124 |
| 6,618,854 B1 * | 9/2003 | Mann | ............................ | 717/124 |
| 7,035,920 B2 * | 4/2006 | Harrison et al. | ................ | 709/223 |
| 7,203,926 B2 * | 4/2007 | Bogle et al. | ................. | 717/124 |
| 7,418,697 B2 * | 8/2008 | Gryko et al. | .................. | 717/124 |
| 7,526,759 B2 | 4/2009 | Sanjar et al. | | |
| 7,543,277 B1 * | 6/2009 | Righi et al. | .................... | 717/125 |
| 7,681,078 B2 | 3/2010 | Moyer | | |
| 8,336,029 B1 * | 12/2012 | McFadden et al. | ........... | 717/124 |
| 2003/0056207 A1 * | 3/2003 | Fischer et al. | ................ | 717/174 |
| 2004/0107415 A1 * | 6/2004 | Melamed et al. | ............. | 717/124 |
| 2005/0172168 A1 * | 8/2005 | Kilian | .............................. | 714/31 |
| 2005/0246688 A1 * | 11/2005 | Gupta et al. | .................. | 717/124 |
| 2006/0156271 A1 * | 7/2006 | Goncharenko et al. | ....... | 717/100 |
| 2006/0288332 A1 | 12/2006 | Sagar et al. | | |
| 2007/0113218 A1 * | 5/2007 | Nolan et al. | .................. | 717/124 |
| 2007/0234293 A1 * | 10/2007 | Noller et al. | .................. | 717/124 |
| 2007/0276692 A1 * | 11/2007 | Mei et al. | .......................... | 705/1 |
| 2008/0109793 A1 * | 5/2008 | Buettner | ....................... | 717/129 |

(Continued)

OTHER PUBLICATIONS

Cunha, José C., et al. "Monitoring and Debugging Support." 1995. Parallel and Distributed Processing Group, Departamento de Informatica, Universidade Nova de.*

(Continued)

*Primary Examiner* — Lewis A Bullock, Jr.
*Assistant Examiner* — Gilles Kepnang
(74) *Attorney, Agent, or Firm* — Kevin Sullivan; Kate Drakos; Micky Minhas

(57) ABSTRACT

Aspects of the subject matter described herein relate to software development. In aspects, code is deployed to a target and debugged. After the debugging has ended, instead of waiting for another version to be deployed to the target, the code is retracted from the target and warm up of the target is performed as needed potentially in parallel with other software development activities with respect to the code.

16 Claims, 5 Drawing Sheets

(56) References Cited

U.S. PATENT DOCUMENTS

| | | | | |
|---|---|---|---|---|
| 2008/0120564 A1* | 5/2008 | Balasubramanian et al. | | 715/771 |
| 2008/0134162 A1* | 6/2008 | James et al. | ................. | 717/168 |
| 2010/0185954 A1 | 7/2010 | Simernitski et al. | | |
| 2011/0225579 A1* | 9/2011 | Khandelwal | ................. | 717/177 |
| 2012/0102460 A1* | 4/2012 | Bates | ........................ | 717/124 |

OTHER PUBLICATIONS

"Walkthrough: Creating a Custom Deployment Step for SharePoint Projects", Retrieved at <<http://msdn.microsoft.com/en-us/library/ee256698.aspx>>, Retrieved Date: Aug. 9, 2010, pp. 15.

"Debugging SharePoint Solutions", Retrieved at <<http://msdn.microsoft.com/en-us/library/ee231550.aspx>>, Retrieved Date: Aug. 9, 2010, pp. 4.

Pattison, et al., "SharePoint Foundation Development", Retrieved at <<http://msdn.microsoft.com/en-us/library/ff798298.aspx>>, Retrieved Date: Aug. 9, 2010, p. 1.

"Solution Deployment with SharePoint 2007", Retrieved at << http://msdn.microsoft.com/en-us/magazine/cc163379.aspx >>, 2007, pp. 6.

Yeung, Andrew, "From Development to Production: Streamlining SharePoint Deployment with DocAve Deployment Manager", Retrieved at <<http://www.avepoint.com/assets/pdf/sharepoint_whitepapers/DocAve_Deployment_Manager_Technical_White_Paper.pdf>>, Mar. 2009, pp. 22.

"Differences Between Sandboxed and Farm Solutions", Retrieved at <<http://msdn.microsoft.com/en-us/library/ee361616.aspx>>, Retrieved Date: Aug. 10, 2010, p. 1.

* cited by examiner

SOFTWARE DEVELOPMENT USING CODE RETRACTION AND BACKGROUND WARM UP

BACKGROUND

In developing software, a software developer often goes through a set of steps. First, the software developer may make changes to code. After changing the code, the software developer may want to check whether the changes work as intended. To do so, the software developer may compile the code, install it on a target, and execute the changed code on the target. A software developer may repeat this process and other steps over and over as the software developer seeks to produce a finished software product.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to software development. In aspects, code is deployed to a target and debugged. After the debugging has ended, instead of waiting for another version to be deployed to the target, the code is retracted from the target and warm up of the target is performed as needed potentially in parallel with other software development activities with respect to the code.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" is to be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Definitions

As used herein, the term "includes" and its variants are to be read as open-ended terms that mean "includes, but is not limited to." The term "or" is to be read as "and/or" unless the context clearly dictates otherwise. The term "based on" is to be read as "based at least in part on." The terms "one embodiment" and "an embodiment" are to be read as "at least one embodiment." The term "another embodiment" is to be read as "at least one other embodiment."

As used herein, terms such as "a," "an," and "the" are inclusive of one or more of the indicated item or action. In particular, in the claims a reference to an item generally means at least one such item is present and a reference to an action means at least one instance of the action is performed.

Headings are for convenience only; information on a given topic may be found outside the section whose heading indicates that topic.

Other definitions, explicit and implicit, may be included below.

Exemplary Operating Environment

Figure 1:
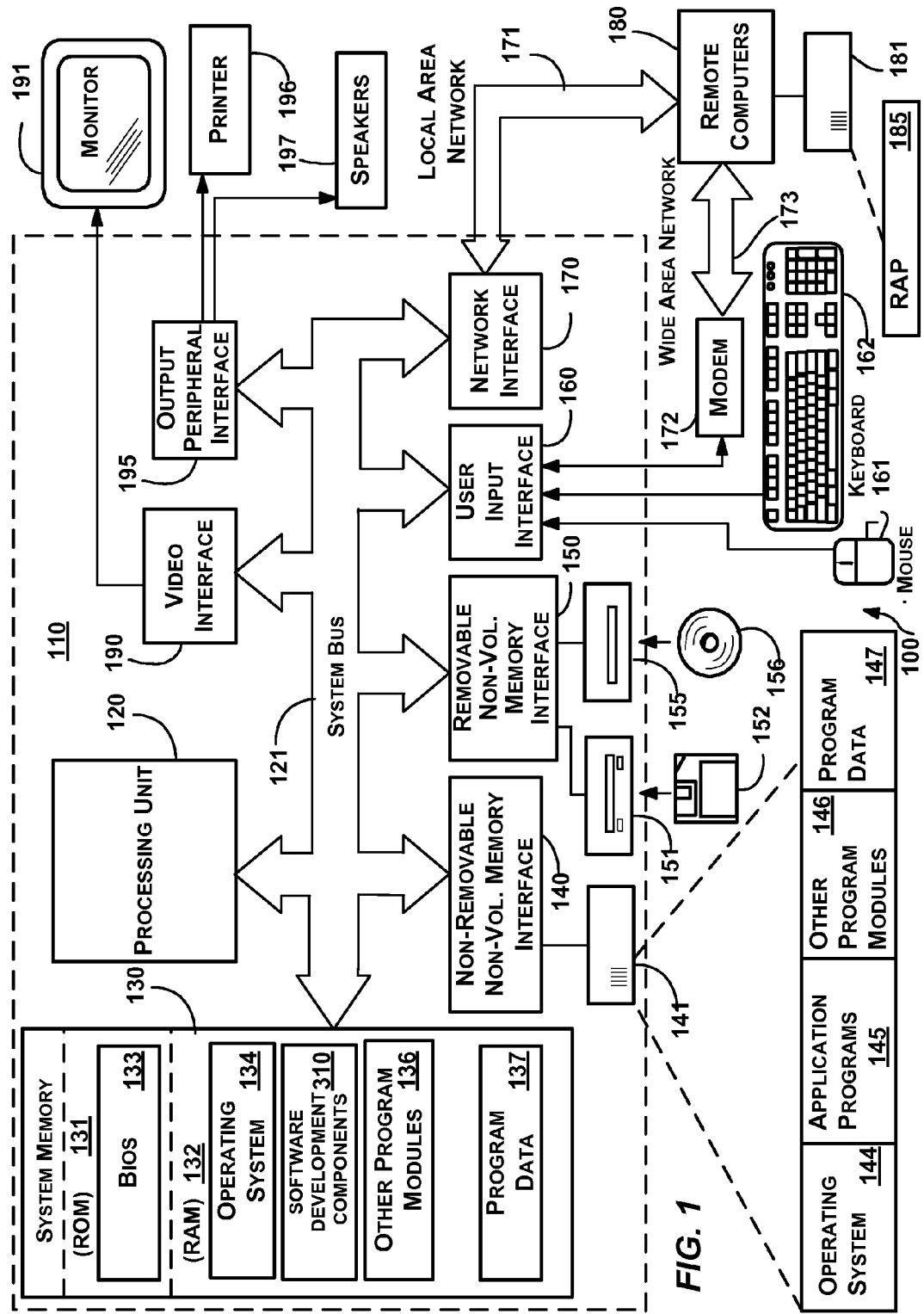
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well-known computing systems, environments, or configurations that may be suitable for use with aspects of the subject matter described herein comprise personal computers, server computers, hand-held or laptop devices, multiprocessor systems, microcontroller-based systems, set-top boxes, programmable consumer electronics, network PCs, minicomputers, mainframe computers, personal digital assistants (PDAs), gaming devices, printers, appliances including set-top, media center, or other appliances, automobile-embedded or attached computing devices, other mobile devices, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. A computer may include any electronic device that is capable of executing an instruction. Components of the computer 110 may include a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes both volatile and nonvolatile, removable and non-removable media implemented in any method or technology for storage of information such as computer-readable instructions, data structures, program modules, or other data. Computer storage media includes RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, software development components 310, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include magnetic tape cassettes, flash memory cards, digital versatile discs, other optical discs, digital video tape, solid state RAM, solid state ROM, and the like. The hard disk drive 141 may be connected to the system bus 121 through the interface 140, and magnetic disk drive 151 and optical disc drive 155 may be connected to the system bus 121 by an interface for removable non-volatile memory such as the interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, software development components 310, other program modules 136, and program data 137. Operating system 144, application programs 145, other program modules 146, and program data 147 are given different numbers herein to illustrate that, at a minimum, they are different copies.

A user may enter commands and information into the computer 110 through input devices such as a keyboard 162 and pointing device 161, commonly referred to as a mouse, trackball, or touch pad. Other input devices (not shown) may include a microphone, joystick, game pad, satellite dish, scanner, a touch-sensitive screen, a writing tablet, or the like. These and other input devices are often connected to the processing unit 120 through a user input interface 160 that is coupled to the system bus, but may be connected by other interface and bus structures, such as a parallel port, game port or a universal serial bus (USB).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Software Development

Figure 2:
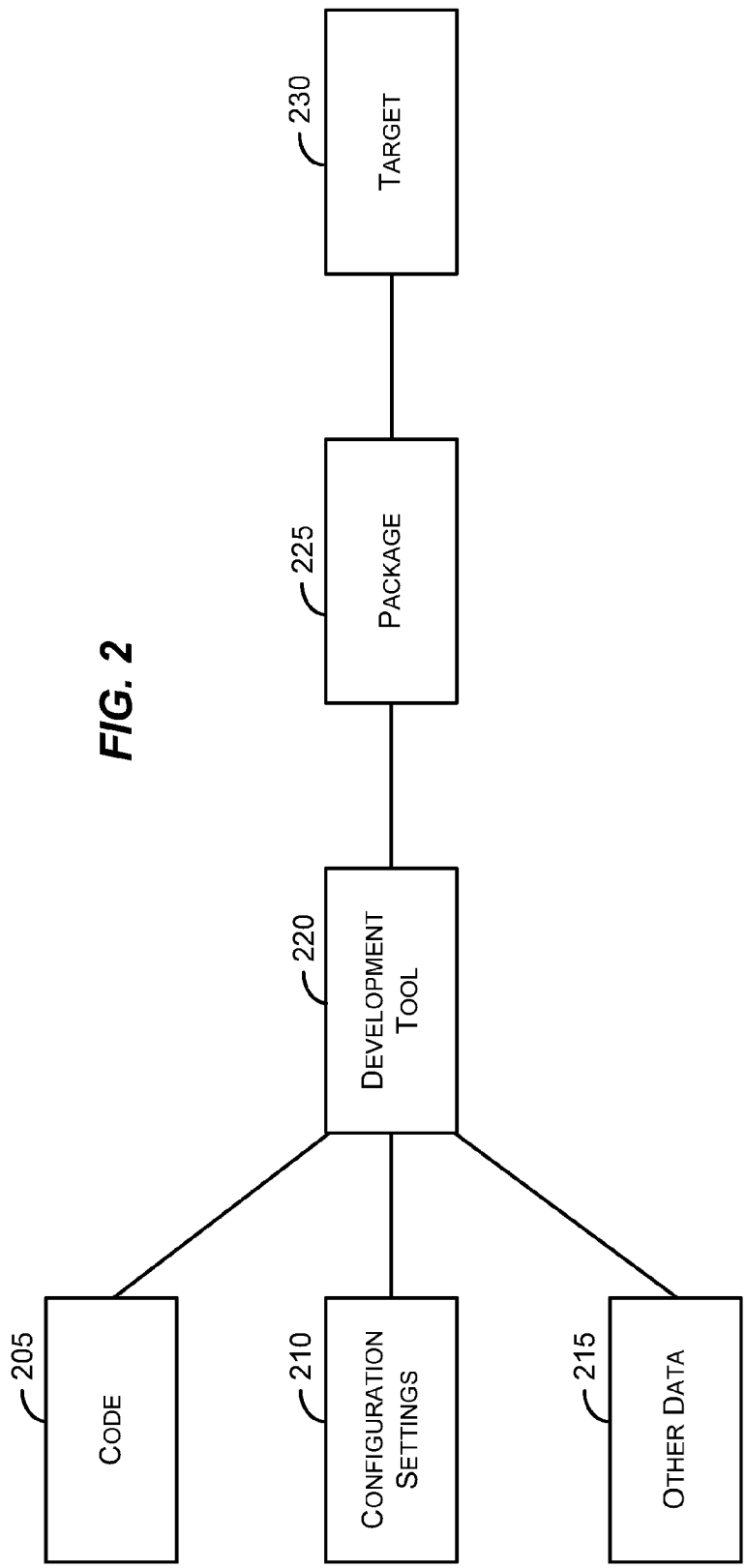
FIG. 2 is a block diagram representing an exemplary environment in which aspects of the subject matter described herein may be implemented.

As mentioned previously, developing software may involve an iterative process of changing and testing code. FIG. 2 is a block diagram representing an exemplary environment in which aspects of the subject matter described herein may be implemented. The environment may include code 205, configuration settings 210, other data 215, a development tool 220, a package 225, a target 230, and may include other entities (not shown). The various entities may be located relatively close to each other or may be distributed across the world.

The various entities may be reachable via various networks including intra- and inter-office networks, one or more local area networks, wide area networks, direct connections, virtual connections, private networks, virtual private networks, some combination of the above, and the like.

The code 205 includes instructions that indicate actions a computer is to take. The code 205 may also include data, resources, variables, definitions, relationships, associations, and the like that include information other than actions the computer is to take. For example, the code may include images, Web pages, HTML, XML, other content, and the like. In an embodiment, the code may be included in a software project. A software project may include or reference the code, the other information indicated above, configuration information, and the like.

Actions indicated by the code 205 may be encoded in a source code language, intermediate language, assembly language, binary code, other language, some combination of the above, and the like.

The configuration settings 210 may include settings to make in a registry, database, or program specific data store. Settings may include data regarding configuration of one or more code units of a package. The term data is to be read broadly to include anything that may be represented by one or more computer storage elements. Logically, data may be represented as a series of 1's and 0's in volatile or non-volatile memory. In computers that have a non-binary storage medium, data may be represented according to the capabilities of the storage medium. Data may be organized into different types of data structures including simple data types such as numbers, letters, and the like, hierarchical, linked, or other related data types, data structures that include multiple other data structures or simple data types, and the like. Some examples of data include information, program code, program state, program data, other data, and the like.

The other data 215 may include data that is not configuration data. For example, the other data may include Web page data, user database data, test data, and the like.

The development tool 220 comprises a component used to develop and/or deploy software. As used herein, the term component may include hardware and/or software. In particular a component may include all or a portion of a device, a collection of one or more software modules or portions thereof, some combination of one or more software modules or portions thereof and one or more devices or portions thereof, and the like. In one exemplary embodiment, the development tool 220 may comprise an integrated development environment (IDE) that allows a software developer to enter and update code, debug code, create and update databases, associate the code with one or more databases, compile the code, create a package, do other actions, and the like.

The development tool 220 may invoke one or more processes to perform various actions. The term "process" and its variants as used herein may include one or more traditional processes, threads, components, libraries, objects that perform tasks, and the like. A process may be implemented in hardware, software, or a combination of hardware and software. In an embodiment, a process is any mechanism, however called, capable of or used in performing an action. A process may be distributed over multiple devices or located on a single device.

In operation, the development tool 220 may use the code 205, the configuration settings 210, and the other data 215 to create a package 225. In particular, the development tool 220 may place the code 205 or code derived therefrom together with configuration data (e.g., data from or code corresponding to the configuration settings 210) and the other data 215 or code derived therefrom into the package 225.

The package 225 may include everything needed to install software on one or more targets. The package 225 may include code, configuration settings, and other data. One purpose of the package 225 is to combine the code, configuration settings, and other data in a deployment unit to simplify deployment. The package 225 may be a self-extracting file or files, a set of one or more files that are not self-extracting, an in-memory representation of the code, configuration settings, other data, and the like. The package 225 may include or be associated with executable code for installing items in the package on a target.

The target 230 may comprise a virtual or physical target. The term virtual target includes an environment or a portion thereof that is simulated or emulated by a computer. For example, when a machine is simulated or emulated at the hardware level, the resulting entity is sometimes called a virtual machine. A virtual machine is a machine that, to software executing on the virtual machine, appears to be a physical machine. The software may save files in a virtual storage device such as virtual hard drive, virtual floppy disk, and the like, may read files from a virtual CD, may communicate via a virtual network adapter, and so forth. Although a virtual machine is one suitable virtual target, other exemplary virtual targets include virtual environments in which operating systems or portions thereof may be emulated or simulated.

A physical target may comprise or reside on one or more computing devices. Such devices may include, for example, personal computers, server computers, hand-held or laptop devices, multiprocessor systems, microcontroller-based systems, set-top boxes, programmable consumer electronics, network PCs, minicomputers, mainframe computers, cell phones, personal digital assistants (PDAs), gaming devices, printers, appliances including set-top, media center, or other appliances, automobile-embedded or attached computing devices, other mobile devices, distributed computing environments that include any of the above systems or devices, and the like. An exemplary device that may be configured to act as one of the above comprises the computer 110 of FIG. 1.

In one embodiment, a target may reside on the same machine as the development tool 220. This type of target may be used, for example, to develop and debug a solution that will later be deployed to other machines. Debugging code may include executing the code to find errors, to locate performance issues, to profile the code, to view visual or other output generated by the code, and the like. Debugging the code does not mean that all or any errors in the code are fixed or otherwise resolved after the debugging activity.

Although the environment described above includes various numbers of the entities, it will be recognized that more, fewer, or a different combination of these entities and others may be employed without departing from the spirit or scope of aspects of the subject matter described herein.

Figure 3:
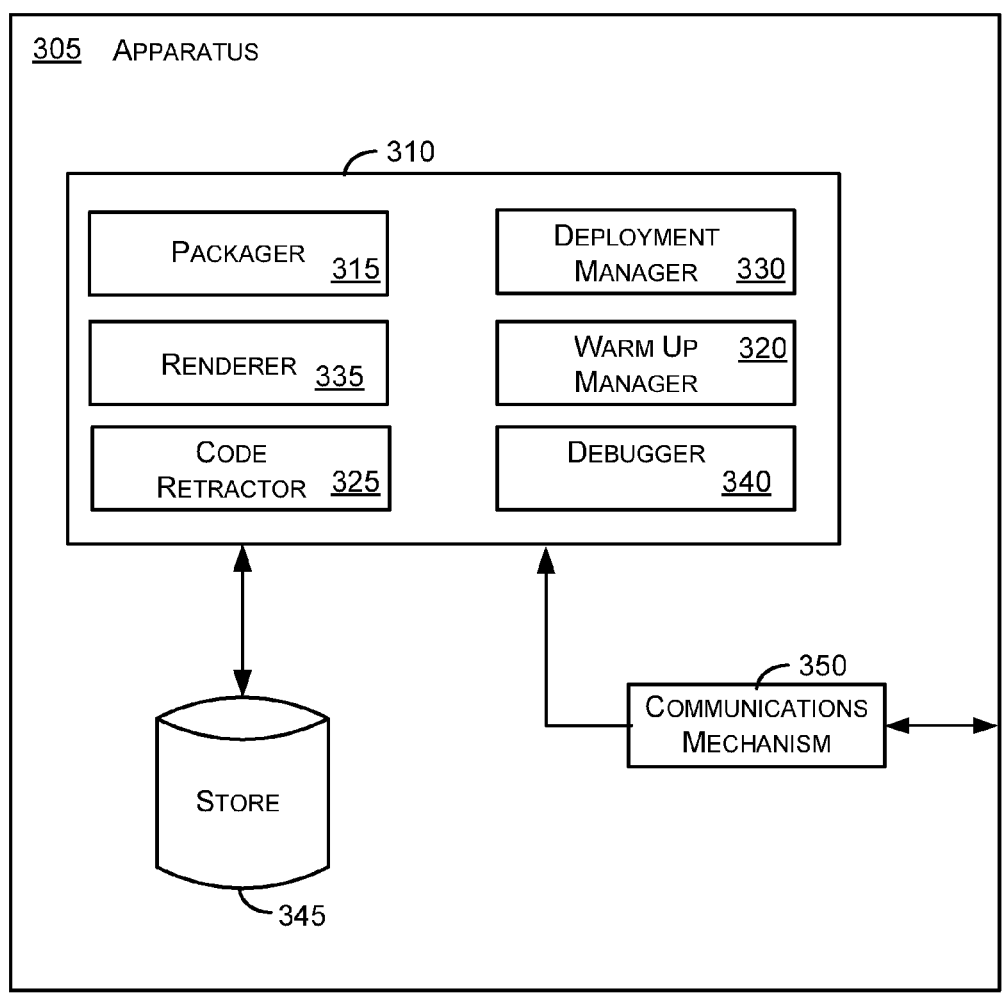
FIG. 3 is a block diagram that represents an apparatus configured in accordance with aspects of the subject matter described herein.

FIG. 3 is a block diagram that represents an apparatus configured in accordance with aspects of the subject matter described herein. The components illustrated in FIG. 3 are exemplary and are not meant to be all-inclusive of components that may be needed or included. In other embodiments, the components described in conjunction with FIG. 3 may be included in other components (shown or not shown) or placed in subcomponents without departing from the spirit or scope of aspects of the subject matter described herein. In some embodiments, the components and/or functions described in conjunction with FIG. 3 may be distributed across multiple devices.

Turning to FIG. 3, the apparatus 305 may include software development components 310, a store 345, a communications mechanism 350, and other components (not shown). The apparatus 305 may host a development tool (e.g., the development tool 220 of FIG. 2) and may have access to the code 205, configuration settings 210, and other data 215 of FIG. 2. The apparatus 305 may be implemented on or as a computer (e.g., as the computer 110 of FIG. 1).

The software development components 310 may be included as part of the development tool 220 or may be separate from the development tool 220 of FIG. 2. The software development components 310 may include a packager 315, a renderer 335, a code retractor 325, a deployment manager 330, a warm up manager 320, a debugger 340, and other components (not shown).

The communications mechanism 350 allows the apparatus 305 to communicate with other entities. For example, the communications mechanism 350 may allow the apparatus to communicate with the target 230. The communications mechanism 350 may be a network interface or adapter 170, modem 172, or any other mechanism for establishing communications as described in conjunction with FIG. 1.

The store 345 is any storage media capable of storing data involved with software development. The store 345 may be implemented as a file system, database, volatile memory such as RAM, other storage, some combination of the above, and the like and may be distributed across multiple devices. The store 345 may be external, internal, or include components that are both internal and external to the apparatus 305.

The packager 315 may be operable to obtain code, configuration settings, and other data, if any, and to place data corresponding to these items in a package for deploying to one or more targets.

The renderer 335 may be operable to display a graphical interface for debugging of the code. The graphical interface may include a user interface element (e.g., a button, menu item, or the like) that is operable to receive an indication (e.g., a mouse click, keyboard click, voice command, or the like) to indicate the end of debugging of the code. For example, after a user has been debugging code, the user may click on a close button of the debugger to explicitly indicate that the user is finished debugging the code.

The renderer 335 may also be operable to display a graphical interface for editing the code. Another indication that the user wants to stop debugging the code may, for example, include the user opening an editor for editing the code. This editor may be rendered by the renderer 335.

As mentioned previously, the target on which code is installed may be on the same device that hosts the development tool that may be used to edit and debug the code. In this case, a graphical interface created by the renderer 335 may be displayed on a display device (e.g., a monitor) of the target computer. When the target is different from the device that hosts the development tool, the renderer 335 may create a graphical interface for display on a display device of the computer that hosts the development tool.

The code retractor 325 is operable to automatically uninstall code from a target in response to receiving an indication to end the debugging of the code. In other words, after a user indicates that the debugging is to end, the code retractor 325 may take actions to uninstall the code from the target without additional instructions from the user.

To uninstall the code on the target, the code retractor 325 may send instructions to the target. These instructions may be performed in a background process that potentially executes in parallel with other activities of the software development components 310. For example, the code retractor 325 may potentially be uninstalling the code from the target while a copy of the code is being edited. This uninstalling helps prepare the target for receiving the next version of the code and may substantially speed up a develop/test cycle as otherwise code may need to be uninstalled before installing the next version.

The code retractor 325 may be further operable to send a message to the target computer to cause a process of the target computer to stop executing so that the process ceases using any resource (e.g., file, database, data structure, or the like) that prevents uninstalling the code from the target computer.

The deployment manager 330 may be operable to install the code of a package on a target. Installing the code may, for example, include pushing or otherwise making available a package that includes the code to the target and then causing the target to execute installation code to install the code of the package on the target.

With some environments, a process on the target may need to be stopped in conjunction with uninstalling code from a target. This same process, however, may need to be executing to run any subsequent version of the code. After the process is restarted, it may take some time before the subsequent version can be executed. This time that a developer needs to wait in deploying a new version of the code to the target may be reduced or eliminated by automatically "warming up" the target right or shortly after the previous version of the code has been uninstalled from the target.

The warm up manager 320 may be operable to send a message to restart a process after uninstalling code from the target computer. The actions taken by the warm up manager 320 may occur in parallel with a development tool receiving changes to the code or performing other actions.

In some cases, a process may be executing on the target, but the process may need to be asked to do something so that it will be fully prepared to execute another version of code. In these cases, the warm up manager 320 may be operable to send a message to the process to cause the process to be prepared to execute another version of the code.

For example, to cause a process to be prepared to execute another version of the code, the warm up manager 320 may send an HTTP command to the process. In response, the process may cache certain files, compile code as needed, and take other actions. As another example, requesting certain information from a target may cause the target to perform similar actions even where the target is not a Web server. These actions may make the process ready and responsive during the next debugging cycle.

The debugger 340 may allow a user to debug code sent to the target. The debugger 340 may insert and remove breakpoints, start and stop a process that executes the code, attach to the process, allow viewing of variables and other data associated with the process, viewing the code as it is being run, step into and out of subroutines, viewing stack values, and the like. The debugger 340 may inform the code retractor 325 when debugging has ended.

In one embodiment, one or more of the software development components 310 may be hosted on the target device. In another embodiment, the software development components 310 may be hosted on a computer other than the target device.

Figure 4:
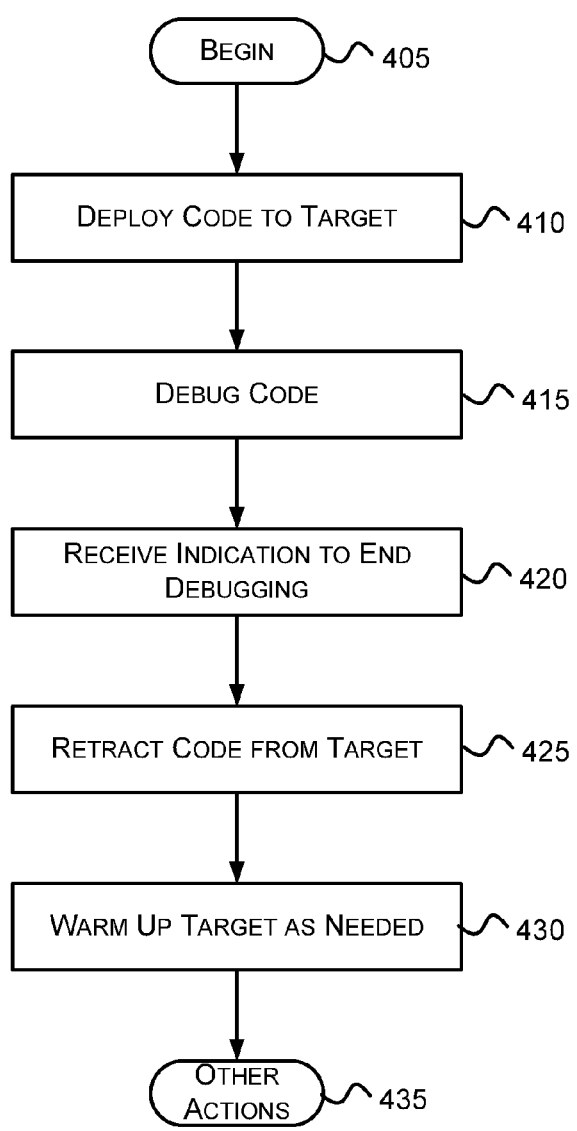
FIGS. 4-5 are flow diagrams that generally represent exemplary actions that may occur in accordance with aspects of the subject matter described herein.
Figure 5:
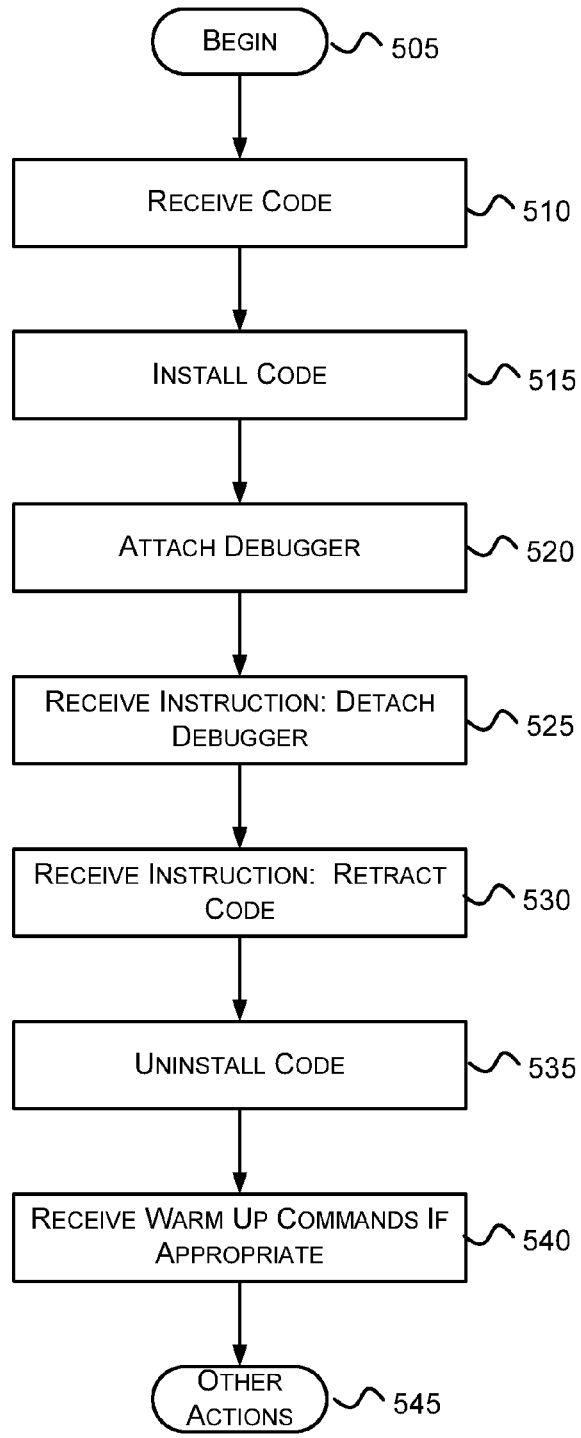

FIGS. 4-5 are flow diagrams that generally represent exemplary actions that may occur in accordance with aspects of the subject matter described herein. For simplicity of explanation, the methodology described in conjunction with FIGS. 4-5 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

Turning to FIG. 4, at block 405, the actions begin. At block 410, code is deployed to a target. For example, referring to FIG. 2, code in the package 225 is deployed to the target 230. The target 230 may reside on a machine (e.g., computer) that also hosts a graphical interface used for debugging the code.

At block 415, the code is debugged. For example, referring to FIG. 2-3, the debugger 340 may be used to debug code on the target 230. To debugger 340 may use a graphical interface such as a window or portion thereof to display code and other information (previously described) useful for debugging. The window may include a user interface element that is operable to receive an indication to end the debugging of the code.

At block 420, an indication to end debugging the code is received. For example, referring to FIG. 3, a graphical interface rendered by the renderer 335 may receive user input on a close button or other user interface element. Receiving this input may indicate that the user wants to stop debugging the code.

At block 425, in response to receiving the indication, the code is retracted (e.g., uninstalled) from the target. For example, referring to FIGS. 2-3, the code retractor 325 may uninstall code from the target 230.

Retracting the code may involve sending one or more instructions to the target to uninstall the code from the target. These instructions may include, for example, adding, changing, and/or deleting registry or other database data, adding, deleting, and/or modifying files. Retracting the code may include spawning a thread to send the one or more instructions. The thread may be operable to work in the background and may potentially send the one or more instructions to uninstall the code potentially while other changes are made to code in a software development tool.

In some cases, retracting may involve sending a message to the target to cause a process of the target to stop executing so that the process ceases using any resource that prevents retracting the code from the target. For example, in some environments files and settings may not be changed or deleted while a process is using them.

At block 430, the target is warmed up as needed. For example, referring to FIGS. 2-3, the warm up manager 320 determines whether the target 230 needs to warm up to be more responsive to executing another version of the code. The warm up manager 320 may determine this using a data structure that indicates whether warm up is needed for the target 230. If a warm up is needed, the warm up manager 320 may take appropriate actions with respect to the target 230.

As one example, an appropriate action may be sending a message to the target to prepare the target to execute another version of the code. One such message may be a HyperText Transport Protocol (HTTP) request.

As another example, in cases where a process needs to be stopped before retracting, after the process has stopped and the code is retracted, another message may be sent to the target to restart the process in preparation to execute another version of the code.

At block 435, other actions, if any, may be performed.

Turning to FIG. 5, at block 505, the actions begin. At block 510, code is received to be deployed on a target. For example, referring to FIG. 2, the target 230 receives the package 225. This package may be received in the form of a file stored in a file system, in the form of a message, an in memory data structure, or the like.

At block 515, the code is installed on the target. For example, referring to FIG. 2, the target 230 may install the code by executing, for example, installation code of the package.

At block 520, a debugger is attached to a process that executes the code on the target. For example, referring to FIG. 2, a component of the target 230 may register with, connect to, or otherwise interact with the process to perform debugging activities (e.g., reporting state, setting break points, and the like) associated with the process. Where the target 230 is on a separate machine from the development tool 220, the component may communicate with the debugger of the development tool 220 (and may be considered an agent thereof).

At block 525, an instruction to detach the debugger is received. The instruction is sent in response to an indication (e.g., user or automated input) to end the debugging of the code. For example, referring to FIG. 2, the target 230 may receive an instruction to detach from the process executing the code. In response, the debugger on the target 230 may unregister with, disconnect, or otherwise cease interacting with the process.

At block 530, an instruction to retract the code is received. The instruction is automatically sent in response to the indication to end the debugging of the code. For example, referring to FIG. 2, the target 230 receives an instruction (one or more commands) to retract the code.

As mentioned previously, in some environments it may be necessary to stop a process before uninstalling the code. In these environments, prior to uninstalling the code, the target may receive an instruction to stop the process. In response, the target may stop the process so that uninstallation may proceed.

In these environments, the process may need to be restarted before executing another version of the code. Rather than waiting until the next version of the code is sent before restarting the process (and thus adding delay), this may be done directly after uninstalling the code.

At block 535, in response to the instruction, the target 230 uninstalls the code. For example, referring to FIG. 2, the code is uninstalled from the target 230.

At block 540, warm up command(s) may be received as appropriate. For example, referring to FIG. 2, as mentioned previously, a message may be received (e.g., an HTTP or other request) to prepare the target 230 to execute another version of the code.

At block 545, other actions, if any, may be performed.

As can be seen from the foregoing detailed description, aspects have been described related to software development. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method implemented on a computing device having at least one processor, the method comprising:
deploying a first version of code to a target machine, the target machine part of the computing device, the first version of code to be debugged on the target machine;
utilizing a graphical interface on the target machine to accept user input for use in debugging the first version of code on the target machine;
receiving, via the graphical interface, an indication to end debugging of the first version of code;
in response to receiving the indication, spawning a thread to send instructions to the target machine to retract the first version of code from the target machine, the thread operating as a background process running on the computing device while changes are made in parallel to a copy of the first version of code in a separate process on the computing device; and
while retracting the first version of code, automatically preparing the target machine to subsequently execute a second version of the code, wherein the second version of the code executes upon complete retraction of the first version of code.

2. The method of claim 1, further comprising installing a package that includes the first version of code on the target machine.

3. The method of claim 2, wherein the package is generated by a software development tool on the computing device.

4. The method of claim 1, wherein changes made to a copy of the first version of code is performed through a software development tool.

5. The method of claim 1, wherein the target machine is a virtual machine.

6. The method of claim 1, further comprising sending a message to the target machine, in response to receiving the indication, to cause a process of the target machine to stop executing so that the process ceases using any resource that prevents retracting the first version of code from the target machine.

7. A computer-implemented system, comprising:
at least one computing device, the computing device including at least one processor and a memory;
the memory including:
a deployment manager, having processor-executable instructions that when executed, installs a first version of code on a target machine;
a renderer, having processor-executable instructions that when executed, displays a graphical interface for accepting user input for use in debugging the first version of code on the target machine, the graphical interface including an element to receive an indication to end the debugging of the first version of code;
a code retractor, having processor-executable instructions that when executed, automatically uninstalls the first version of code from the target machine in response to receiving the indication to end the debugging of the first version of code through a background process while changes are made in parallel to a copy of the first version of code in a separate process, the separate process running on the computing device; and
a warm-up manager, having processor-executable instructions that when executed, sends a message to prepare the target machine for subsequent execution of a second version of the code while the code retractor retracts the first version of code,
wherein the deployment manager executes the second version of the code upon complete retraction of the first version of code.

8. The system of claim 7, wherein the renderer displays a graphical interface for editing the code, and wherein the code retractor sends instructions to the target machine to uninstall the first version of code from the target machine while a copy of the first version of code is edited in the graphical interface.

9. The system of claim 7, wherein the code retractor sends a message to the target machine to cause a process of the target machine to stop executing, so that the process ceases using any resource that prevents uninstalling the first version of code from the target machine.

10. The system of claim 7, wherein the target machine is a virtual machine.

11. A non-transitory computer-readable storage medium having computer-executable instructions, which when executed perform a method, the method comprising:
deploying a first version of code to a target machine, that target machine part of a computing device, the first version of code to be debugged on the target machine;
utilizing a graphical interface to accept user input for use in debugging the first version of code on the target machine;
receiving, via the graphical interface, an indication to end debugging of the first version of code;
in response to receiving the indication, spawning a thread to send instructions to the target machine to retract the first version of code from the target machine, the thread operating as a background process running on the computing device while changes are made in parallel to a copy of the first version of code in a separate process on the computing device; and
while retracting the first version of code, automatically preparing the target machine to subsequently execute a second version of the code, wherein the second version of the code executes upon the complete retraction of the first version of code.

12. The non-transitory computer-readable storage medium of claim 11 wherein deploying a first version of code to a target machine comprises installing a package that includes the first version of code.

13. The non-transitory computer-readable storage medium of claim 12, wherein the package is generated by a software development tool.

14. The non-transitory computer-readable storage medium of claim 11, wherein changes made to a copy of the first version of code is performed through a software development tool.

15. The non-transitory computer-readable storage medium of claim 11, wherein the target machine is a virtual machine.

16. The non-transitory computer-readable storage medium of claim 11, further comprising: sending a message to the target machine to cause a process of the target machine to stop executing, so that the process ceases using any resource that prevents retracting the first version of code from the target machine.

* * * * *